MAGNETIC CORE BUFFER STORAGE AND CONVERSION SYSTEM

Filed July 14, 1954 2 Sheets-Sheet 1

INVENTORS
WERNER BUCHHOLZ
MUNRO K. HAYNES
GORDON E. WHITNEY
BY William V. Schelberg
AGENT

*INVENTORS*
WERNER BUCHHOLZ
MUNRO K. HAYNES
GORDON E. WHITNEY
BY William V. Schelberg
AGENT United States Patent Office 2,931,014

Patented Mar. 29, 1960

2,931,014

MAGNETIC CORE BUFFER STORAGE AND CONVERSION SYSTEM

Werner Buchholz and Munro K. Haynes, Poughkeepsie, N.Y., and Gordon E. Whitney, Derby, Colo., assignors to International Business Machines Corporation, New York, N.Y., a corporation of New York Application July 14, 1954, Serial No. 443,234

13 Claims. (Cl. 340—174)

This invention relates to information processing devices and is directed in particular to apparatus for converting data in one form and available at one rate to another form for delivery at another rate.

Apparatus of this nature is of particular utility in connection with input-output devices for electronic digital computers as a transfer medium between systems of different pulse input and output speeds. In systems operating with serial data, each digit representing signal is arranged to occupy one of a succession of digit intervals as in the mode of storage generally employed with a magnetic tape or drum, whereas information stored in conventional type perforated record cards is generally analyzed and recorded in parallel form and may be available at a rate dissimilar to that required for serially operated devices.

In accordance with the invention, information sensed from a record card in parallel form is stored in an array of magnetic cores at the frequency of operation of a card sensing machine and this information is then read out of the array in serial form at the rate demanded by a utilization device.

Conversely, a utilization device, after performing arithmetic or other operations on information from one or more information input sources, or merely temporary storage thereof, may deliver selected resultant information in serial form for entry in a permanent record such as by perforations in a standard record card, or by printing on a record form. Apparatus for performing this recording operation may be adapted to accept signals representing information in parallel form and at a still different rate so that a buffer storage and converter device of the type to be described may also be used as an intermediate component to couple the output and input of these apparatus to provide correct timing as well as a conversion of the form of the data.

Accordingly, one broad object of this invention is to provide a digital information buffer storage and conversion system whereby information may be changed in form and the rate of flow of information from a storage source to a utilization device, or vice versa, may be correctly timed.

A further object of the invention is to provide an improved circuit arrangement for record card sensing applications whereby power requirements of such circuits are lessened.

Still another object of the invention is to provide an improved ring circuit employing magnetic cores and adapted to provide sufficient power for operation of an array of magnetic devices.

Other objects of the invention will be pointed out in the following description and claims and illustrated in the accompanying drawings, which disclose, by way of example, the principle of the invention and the best mode which has been contemplated of applying that principle.

As previously mentioned, signals representing information may be available in parallel form when the device to which they are directed requires serial information and, conversely, the information may be available in serial form with the utilization device requiring parallel information and in each instance at a different rate of pulse delivery. It is to be understood that the source of information as well as the utilization device may be any conventional medium such as a punched card or tape, a magnetic tape or drum, electronic or electromechanical apparatus such as a register, computer, or any device of a like nature. In explanation of the invention specific means are first described in connection with a buffer converter for receiving information in a parallel sense and for converting it to serial delivery at a rate dissimilar to that of the source means. Conversion from serial to parallel form is accomplished in a similar manner as will be described hereafter.

Figure 1:
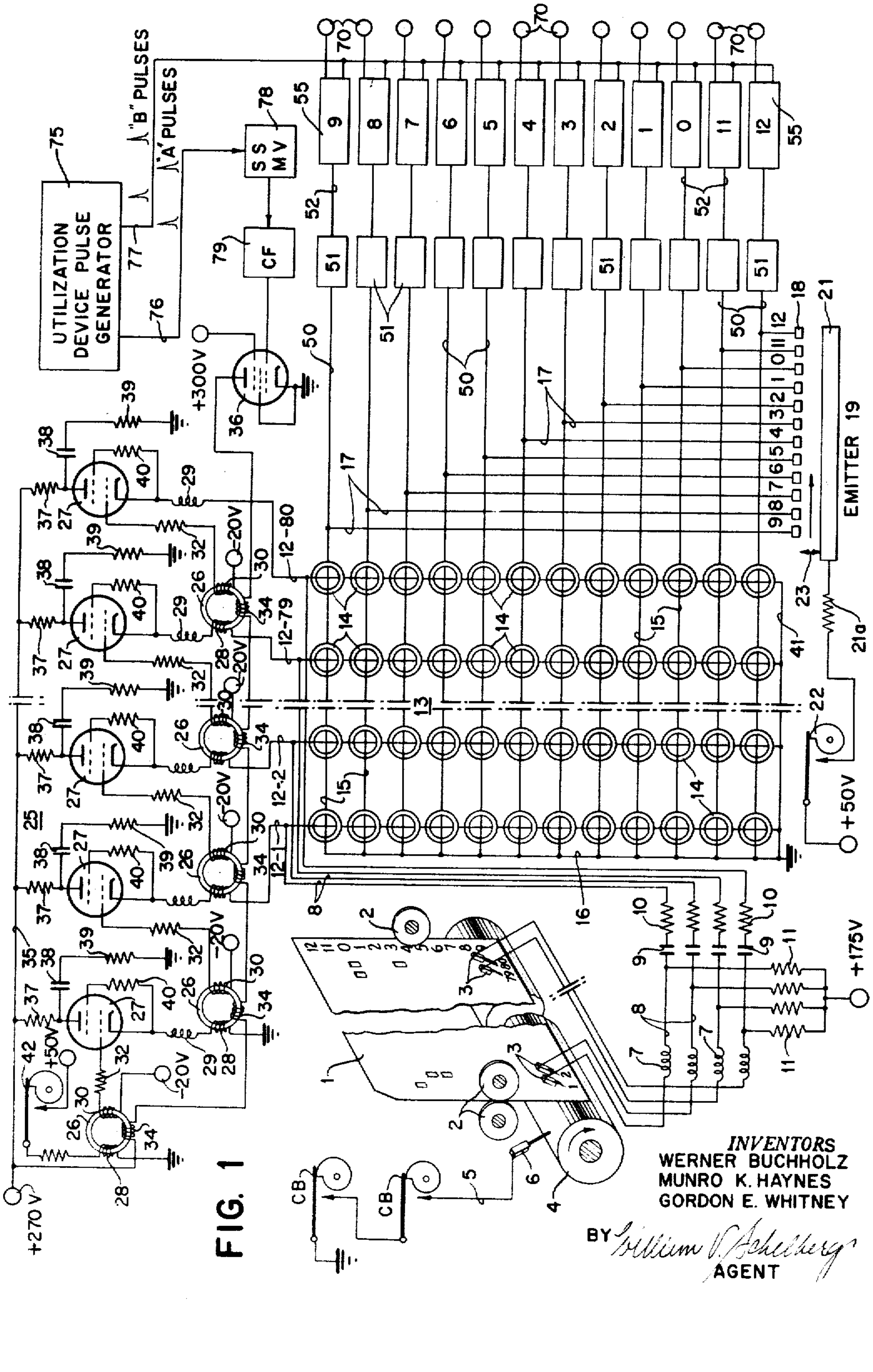
Figure 1 is a schematic circuit diagram illustrating use of the system in performing information conversation from parallel to serial form with dissimilar input and output information delivery rate.

Referring now to Figure 1 of the drawing, record cards 1 of conventional type having eighty vertical columns each with 12 perforation positions are fed from a supply hopper (not shown) with the 9's positions first and are advanced by feed rollers 2 past a row of sensing brushes 3, one of which is provided for each card column. Each of the brushes 3 concurrently sense like digit representing perforations in the card columns by making contact with a conductive roller element 4 through the perforations. The roller 4 is held at ground potential by connection through a circuit including a lead 5 and a brush 6 which is maintained in contact with the roller and, as a perforation is sensed in a particular column of the card, the associated reading brush 3 contacts the roller 4 to complete a circuit to ground. As the record card 1 is fed past the brushes 3, the relative times that the sensing circuit is completed indicates the value assigned to the perforation positions.

Each of the 80 brushes 3 provided for a standard card is connected individually through a coil 7 to a line 8 in which a condenser 9 and series resistor 10 is coupled, with the eighty lines 8 connected at the junction of elements 7 and 9 to a terminal maintained at +175 volts potential through further individual resistors 11. Only the first and last pairs of brushes and associated circuits are illustrated to avoid complicating the drawings. The condensers 9 are normally charged to substantially the voltage of this source until a perforation is sensed in a record card column, at which time they discharge through the choke 7 and brushes 3 and 6, providing a differentially timed electrical impulse to the lines 8. At least the interval of time between the passage of successive cards or between rows of a single card is available for recharging the condensers 9 so that the 175 volt source of potential (not shown) may be of low power capacity with consequent economic advantage.

The above described sensing operation converts the data recorded by perforations into differentially timed electrical signals indicative of the numerical value assigned to the perforation position and the information thus converted into electrical impulses is then stored in a two dimensional magnetic core storage array.

The leads 8 are connected to corresponding ones of 80 column conductors 12 of an array indicated generally as element 13. The conductors 12 are given subscripts corresponding with the associated column of the matrix.

The magnetic cores are arranged as a two dimensional array having eighty vertical columns each comprising twelve annular bistable cores 14, with the conductors 12 forming a set of windings linking each of the cores in a corresponding column. Twelve row conductors 15 are likewise provided and form windings linking each core of the 80 columns representative of a similar card perforation position or differential value. Each of the windings 15 are connected at one end to a common grounded bus 16 and at their other ends to a set of leads 17 coupled with individual corresponding contacts 18 of a twelve point emitter 19. The common terminal 21 of the emitter is connected through a resistor 21–*a* and a cam operated contact 22 to a positive source of potential of +50 volts, and a contact wiper 23 is caused to operate in synchronism with the card feed apparatus so that pulses are supplied successively through leads 17 to the leads 15 at a digit level corresponding with the digit level of the record card being concurrently sensed at the brushes 3.

Figure 2:
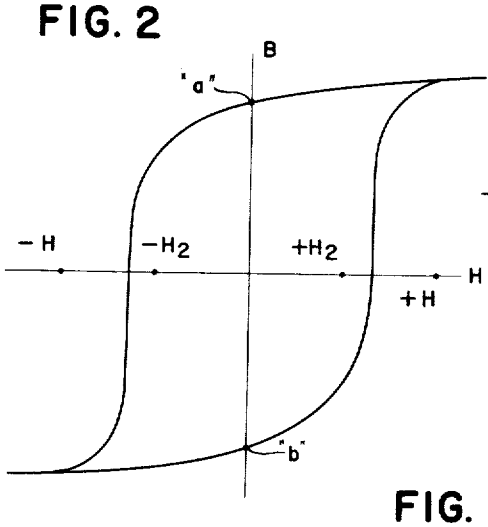
Figure 2 illustrates the hysteresis characteristic for a typical magnetic storage core.

The magnetic cores 14 forming the individual storage elements of the array are so-called memory cores which exhibit a hysteresis characteristic such as that indicated in Figure 2. Such cores are readily adapted for use as binary storage elements as they exhibit a high degree of residual magnetism and have a low coercive force. For such purposes one state of magnetic remanence, for example point "*a*," is taken to represent a binary one and the opposite remanence state, point "*b*," then represents a binary zero. As shown in Figure 2, with a force of H magnitude applied, greater than the coercive force, and of proper direction, the hysteresis loop is traversed and the core retains the magnetic polarity toward which it is driven upon relaxation of the applied force. A force less than the coercive force, however, produces only a negligible flux change depending upon the squareness of the hysteresis characteristic, and the polarity of the core remains unchanged. The card reading circuit, including the lines 12, is adapted to provide a differentially timed current pulse providing a magnetomotive force of $$\frac{H}{2}$$

magnitude, less than the coercive force, to each core of the associated array column, while the emitter circuit is likewise designed to successively provide a magnetomotive force of $$\frac{H}{2}$$

magnitude, less than the coercive force, to each of the cores at similar digit levels in the array. Applied individually, no resultant change in the polarization takes place; however, when applied simultaneously a force of H is provided in the core located at the intersection of the pulsed lines 12 and 15 and this core is caused to change states if initially in an opposite state and the combined forces are of proper direction so as to be additive in effect.

The record card sensing apparatus described analyzes the card columns so that the information contained in the eighty columns is presented to the array on a parallel basis with the data stored in successive cards spaced apart in time, whereas, in accordance with the present example, a utilization device may be adapted to accept information only as a series of time spaced representations.

In order to convert the information transferred to the magnetic core array into serial form, the eighty columns of cores are interrogated serially by means of a core thyratron ring circuit generally designated as component 25. This ring circuit comprises a chain of cascade coupled pulse producing stages each including a core 26 of the type having a somewhat rectangular hysteresis loop (Fig. 2) and a thyratron tube 27. Each core 26 is provided with three windings including an input coil 28 connected in series with the associated thyratron 27 through a pulse shaping inductance 29, an output coil 30 connected at one end to a negative voltage bias source of −20 volts and at the other end through a resistor 32 to the control grid of the next succeeding adjacent thyratron stage, and a read out winding 34 connected in series with a similar read out winding of each other stage. The series connected windings 34 form a circuit connecting a positive 270 volt line 35 with the plate of a pulse driver tube 36. The supply line 35 is also connected to the plate of each thyratron 27 through a 90K ohm recharging resistor 37 and the plate terminal is also coupled to ground through a capacitor 38 and a limiting resistor 39. The second grid of each thyratron 27 is connected to its cathode electrode through a protective 10K ohm resistor 40.

Eighty stages are provided, one for each column of the storage array 13, with the windings 28 of each stage connected to a corresponding column winding 12 and the opposite terminals of the windings 12 connected to a common grounded lead 41. A preliminary stage is coupled to the stage associated with column 1 and is provided with a cam contact 42 operated by the card sensing machine.

Each of the cores 26 is initially set at a first remanence state, as for example point "*b*" on the hysteresis loop illustrated in Fig. 2, and subsequent closure of the switch 42 on completion of a card sensing operation, pulses the winding 28 of the core 26 of the preliminary stage causing it to reverse its remanence state so as to attain point "*a*" on the loop. When the driver tube 36 is rendered conductive, as will be described hereafter, a pulse is applied to each of the series connected read windings 34 and is of such polarity as to apply a large negative M.M.F. to each core 27. With the exception of the first core, each stands at point "*b*" on its hysteresis loop and remains relatively unaffected, however, the first core changes state returning from point "*a*" to point "*b*" and an output voltage pulse is induced in the coil 30 of this core as the magnetic field collapses and builds up in the other direction. This induced pulse overcomes the −20 volt bias on the grid of the preliminary stage thyratron 27, as applied thereon through the winding 30, and this tube now fires with the associated condenser 38 discharging through the tube, the coil 29 and the winding 28, causing the core 26 of the column 1 ring stage to reverse remanence state or go from point "*b*" to point "*a*". After the aforementioned condenser 28 is discharged, the tube 27 is extinguished as the plate resistor 37 is sufficiently large to prevent continued conduction. The first ring stage is now primed and each succeeding pulse delivered by the driver tube 36 causes a successive firing of the thyratrons 27 in a progressive manner so that the column windings 12 are pulsed in turn and the eighty columns of cores are read out in succession.

As each of the column windings 12 are pulsed from the thyratron ring circuit 25, sufficient current is passed to alone provide a magnetomotive force equal to or greater than −H magnitude to each core 14 of the associated column in the memory array 13 and causes those cores to reverse remanence state if representing a digit read from the record card 1 at that position or if standing at point "*a*" on their hysteresis loops.

In reversing remanence states from "*a*" to "*b*," the memory core 14 induces a voltage in the coils 15 which now function as secondary windings and this induced pulse is applied through a lead 50, to a pulse transformer circuit 51, as will be later described, provided for each digit level of the matrix. The amplified output is then applied, via corresponding leads 52, to information exit channels or to individual triggers 55 which store the representative indication until read out for further use.

Twelve triggers 55 are provided, one for each line 12, representative of a perforation position on the record card. The triggers 55 may be of any conventional type known to the art, as for example, a vacuum tube trigger, and are shown in block form as they form no part of the present invention per se.

Figure 3:
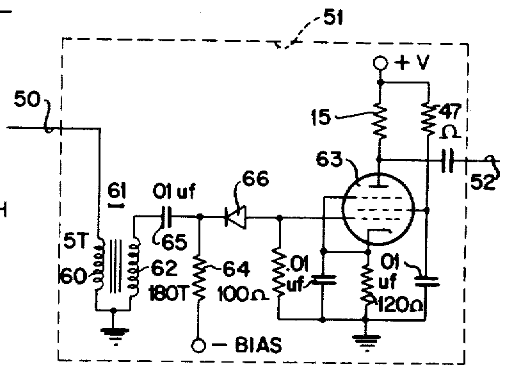
Figure 3 illustrates the pulse transformer-amplifier circuit shown in block form in Fig. 1 in detail.

The pulse transformer circuits 51 shown in Fig. 1 in block form are illustrated in detail in Fig. 3 where the lead 50 coupled with the windings 15 of the memory array is seen to be connected to the primary winding 60 of a pulse transformer 61. The secondary winding 62 is connected to the grid of an amplifier tube 63 through a threshold circuit including a resistor 64 connected to a negative bias source (not shown), a blocking condenser 65 and diode 66. As the tube 63 is cut off by an amplified negative pulse whose magnitude exceeds the minimum threshold value, the plate potential increases for the interval and a positive voltage pulse is produced on the output lead 52 connected therewith and is applied to the input of the associated trigger device or directly to exit channels coupled to a utilization device input. The triggers 55 may be of any conventional type and are set at a first stable condition initially or before the first column of the matrix of cores 13 is interrogated by the ring circuit 25 as will be described, and the output pulse appearing on leads 52 and applied thereto causes those triggers to change to their second stable condition. Trigger output voltages, or their transitions, may be utilized in any conventional fashion and it is not intended that the invention be limited to the specific mode of trigger response here described.

In the utilization device, apparatus is provided for producing a pair of timed electrical impulses having a repetition rate corresponding with the desired rate of delivery of information. Such apparatus may be in the form of a crystal controlled pulse generator, mechanically operated contacts driven in synchronism with the utilization device or other electronic or electromechanical means as desired having correlation with the delivery rate to be maintained. Such a pulse producing component is illustrated in block diagram form as element 75 having a pair of output conductors 76 and 77 to which timed spaced pulses "A" and "B," respectively, are delivered as shown graphically above the output lines. These "A" pulses are employed to control the rate of delivery of the stored information to the utilization device, and in performing this function control the operation of the thyratron ring circuit 25. The "B" pulses control the reset of the twelve triggers 55. Each "A" pulse causes a column of the storage matrix to be pulsed and read out while each following "B" pulse causes the storage triggers 55 to reset to their first stable states. The conductor 76 is connected to pulse a single shot multivibrator 78 and the output of the latter pulses the control grid of the aforementioned ring driver tube 36 through a cathode follower 79. Elements 78 and 79 are shown in block form as they have attained a conventional status in the art and any one of many well-known circuit arrangements may be employed with the multivibrator designed to produce an output pulse of approximately one half microsecond duration.

The lead 77 is connected to the remaining input terminal of each of the triggers 55 and causes those triggers standing at a condition representing stored information at that digit level to revert to an initial state, producing an output pulse on associated terminals 70 at "B" pulse time. This output signal or an output pulse that occurs at the "A" time when the trigger turns on; or D.C. output levels may be used as mentioned heretofore.

The operation of the card feed and sensing device may occur as a continuous process; however, as each successive card is delivered from a card hopper (not shown) to the brush sensing station, some interval is allowed between the trailing edge of each card and the leading edge of the successive card, as the sensing of each card and entry of the information in the magnetic core array 13 is completed, the cam operated switch 42 is closed priming the first preliminary stage of the ring 25 so that the aforementioned "A" pulses are effective to step the ring and cause a column by column read out. The interval between the sensing of successive records cards is therefore seen to be employed for the delivery of stored data from the buffer device and the usually slower card feeding and sensing device is operated at its full speed.

The apparatus thus far illustrated and described transforms information available in parallel form to serial form and at a different pulse delivery rate. Conversion may also be accomplished from one coded form of the information to another by means of a conventional diode matrix code converter, or at the same time as the time-space conversions described take place, by simple alteration of the emitter connections. A twelve digit Hollerith code is employed in the standard IBM record cards and provides for both numerical and alphabetical coding of information wherein a single perforation or impulse in the 0 through 9 index positions represents a like numerical value whereas combinational perforations including the 11 and 12 positions represent alphabetical or standard type symbols. In accordance with a modified binary code the decimal digits 1, 2, 4 and 8 are represented by single binary digits while a decimal 3 is represented by binary digits in the 1 and 2 positions, a decimal 5 by binary digits in the 1 and 4 positions, a decimal 6 by binary digits in the 4 and 2 positions, and a decimal 7 by binary digits in the 1, 2 and 4 positions and a decimal 9 by binary digits in the 1 and 8 positions. To develop a modified binary code output within the buffer device illustrated, the 3, 5, 6, 7 and 9 rows of cores in the matrix 13 may be eliminated and the emitter contact 18 and lead 17 for the 3 position connected to the windings 15 of the 1 and 2 positions, that for the 5 position connected to windings 15 of the 1 and 4 positions, etc., in a manner similar to that described in the copending application for Magnetic Core Converter, Serial Number 358,101, filed May 28, 1953, on behalf of Edward J. Rabenda.

The conversion arrangement illustrated provides for transforming information available in parallel form to serial form, however, a transformation in the reverse sense may be accomplished in a like manner by applying serial information to the leads 17 in synchronism with the pulsing of the leads 12 by an eighty point emitter or other timing distributor. Reading the information in parallel may then be accomplished at a desired rate through pulsing of a twelve stage thyratron ring circuit coupled to the twelve leads 15. Eighty triggers 55 or exit channels would then be provided and connected individually to the leads 12.

Figure 4:
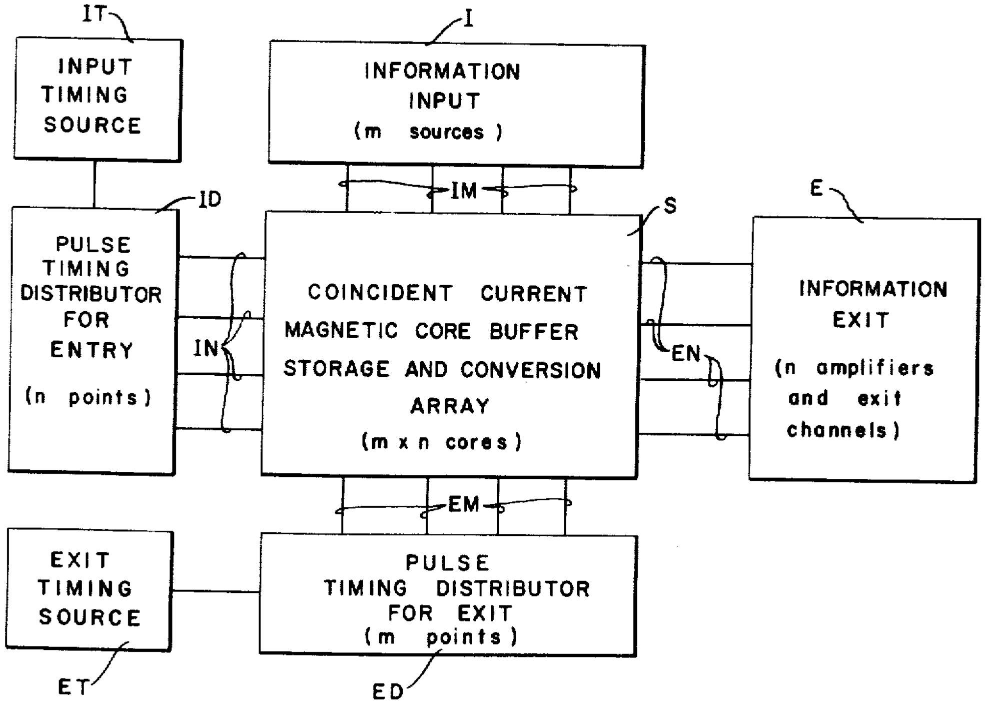
Figure 4 is a block diagram of the magnetic core buffer and conversion system employed in explaining the broad scope of the invention.

The flexibility of the system described may be more clearly appreciated with the several components illustrated in block diagram form. Referring now to Fig. 4, the buffer storage and conversion system comprises a component S representative of a matrix of magnetic cores arranged as a two dimensional array having M cores along one and N cores along the other coordinate dimension. The notations M and N have been selected to indicate that the number of cores may be arbitrarily chosen and that the array need not be symmetrical. The input components comprise the block I representing M input signal sources and the block ID representing an N point pulse distributor operated at a rate determined by an input timing source IT. The exit components comprise the block E representing N information exit channels and the block ED representing an M point pulse distributor operated at a rate determined by an exit timing source ET.

As previously mentioned, information representing signals may be available in parallel form when serial information is required or conversely information may be available in serial form while parallel information is required with, in each instance, a different rate of information delivery also necessary to couple systems of different pulse input and output speeds.

As described specifically in connection with Fig. 1, with parallel information available the card sensing unit delivers information signals on the M input channels 8 with the signals on each channel differentially timed to represent one of N possible values. In Fig. 4, the element I corresponds with the card sensing device with the M input channels 8 being the leads IM. The input timing cam 22 corresponds with the pulse source IT and the emitter 19 corresponds with the entry pulse distributor ID. Serial output is obtained by pulsing the M windings of the array in sequence through leads EM by operation of the exit timing source ET and exit pulse timing distributor ED, with an output developed on one of the EN exit channels and directed to unit E in serial sequence. The exit timing source ET in Fig. 4 corresponds to the pulse generator 75 and tube 36 in Fig. 1, with the element ED being the ring circuit 25.

A transformation in the reverse sense, that is with serial information available and parallel information desired for use, the input component I applies a series of pulses spaced apart in time on one of the M input leads IM as representative of values for each of N digits, and the entry timing distributor ID pulses the IN entry coordinate leads in sequence in accordance with digit delivery determined by IT. The parallel output is then obtained by operation of the component ED in pulsing the EM channels in sequence with a current equal to or greater than that producing −H magnetomotive force and developing N differentially timed impulses representing N items of information appearing at component E through leads EN, the value representing time differential of the impulse on each channel being determined by the timing source ET.

It is thus seen that the converter buffer system is capable of operating in a manner to convert both the form, rate and code of information representing electrical signals and, while specific structure and values of certain elements are shown and described in connection with the foregoing explanation of the system, it is to be understood that the invention is not to be limited to such specific values and that other known equivalent elements and components may be employed without exercise of invention.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An information processing device comprising in combination, sensing means adapted to read information from a standard record card in parallel form, a buffer storage device comprising an array of bistable magnetic elements arranged in columns corresponding in number to the components of a multi-digit character stored in said record card and having in each column a core for each one of a plurality of code designations employed, pulse means for causing particular combinations of said cores in each column to change from a first to a second stable state in response to coincident electrical impulses representative of the numerical value of the component of the multi-digit character corresponding to that column as a record card is sensed, and means for sensing the changed state of said cores in column by column fashion for delivering the information stored therein in serial form, said means including a pulse distributor component activated in accordance with a rate of operation desired by a utilization device.

2. An information processing device comprising an array of coordinately arranged memory elements for registering information, means for transmitting the information to said array in successive lines along one coordinate direction thereof, means for successively enabling groups of said elements in lines along another coordinate direction thereof, the elements in each said last lines being equal in number to the number of information characters employed whereby selected ones of said elements attain a first stable state, means for successively enabling said elements along the other said coordinate direction thereof causing those elements in said first stable state to revert to a normal state, said means including a chain of cascade connected stages successively operated in accordance with a prescribed rate.

3. An information processing device comprising in combination, sensing means adapted to read information from a standard record card in parallel form, a buffer storage device comprising an array of coordinately arranged bistable memory elements having a number of columns of elements corresponding with the number of items of information in said record card and having in each column a number of elements corresponding with the number of variations in said items, pulse means for causing certain of said elements in each column to register the information sensed from said record card in response to coincident electrical impulses representative of the variations in the items in the corresponding column as said card is sensed, and means for interrogating said matrix column by column in serial fashion in response to electrical impulses developed successively by a ring circuit activated at a rate determined by a device adapted to employ said stored information in serial form.

4. In a record card sensing system adapted to analyze a business record wherein information is stored in the form of perforations in said card, a conductive element positioned at one side of said card, a row of sensing devices positioned at the opposite side of said card whereby circuits including series inductance coils are completed with said conductive element through said perforations to develop differentially timed impulses indicative of the value represented by said perforations, a capacitor in each of said sensing circuits, means for charging said capacitors for subsequent discharge through said sensing circuits to produce said timed impulses, said sensing system reading said perforations in parallel form, buffer storage means coupled to said circuits for registering said information, and means for subsequently interrogating said buffer storage means for developing the information stored therein in serial form.

5. An information processing device comprising a matrix of coordinately arranged memory elements for registering information, means for transmitting impulses representative of sensed information to said matrix in successive lines along one coordinate direction thereof at a first rate, pulse means for successively enabling groups of said elements in lines along another coordinate direction thereof and in coincidence with said impulses, the elements in each said last lines being equal in number to the number of information characters employed whereby selected ones of said elements attain a first stable state, and means for successively enabling said elements along the other said coordinate direction thereof causing those elements in said first stable state to revert to a normal state, said latter means being operated in accordance with a second prescribed rate.

6. An information processing buffer storage and conversion device comprising an array of bistable magnetic elements arranged in columns corresponding in number to the components of a multi-digit character and having in each column a core for each one of a plurality of code designations, pulses means for causing particular combinations of said cores in each column to change from a first to a second stable state in response to coincident electrical impulses representative of the numerical value of the component of the multi-digit character corresponding to that column, means for sensing the changed state of said cores in column by column fashion for delivering the information stored therein in serial form and including a magnetic core pulse producing component activated in accordance with a rate of operation desired by a utilization device.

7. An information processing buffer storage device comprising a matrix of coordinately arranged bistable memory elements having a number of columns of elements corresponding with a number of items of information and having in each column a number of elements corresponding with the number of variations in said items, pulse means for causing certain of said elements in each column to successively register the information delivered thereto in serial form as electrical impulses coincident therewith and representative of the variations in the items, means for interrogating columns of said matrix in accordance with successive item variations in response to electrical impulses developed at a rate determined by apparatus adapted to employ said stored information in parallel form.

8. An information processing device comprising a matrix of coordinately arranged bistable magnetic memory elements for registering information, means for transmitting information sensed as electrical impulses to said matrix along one coordinate direction thereof, means for successively enabling groups of said elements along another coordinate direction thereof, the memory elements in said latter coordinate direction being equal in number to the number of information characters employed whereby selected ones of said elements attain a first stable state, means for successively enabling said elements along the other said coordinate direction causing those elements in said first stable state to revert to a normal state, said means including a chain of cascade connected stages each comprising a saturable magnetic core and thyratron successively operative in accordance with a prescribed rate, each of said elements having a first, second and third winding with the first winding of each of of said elements connected to said thyratron, circuit connections between the second windings of said elements and the thyratron associated with a succeeding one of said elements and adapted to activate the thyratron only when the flux direction within the element of said second winding changes from a predetermined direction to the other direction in response to an actuating signal applied to said third windings, activation of said discharge device causing current flow in said first winding and establishing a predetermined flux direction within the element of said first winding, and a load circuit connected in series with each of said first windings and said discharge devices.

9. An information processing device comprising an array of coordinately arranged memory elements for registering information from a business record, means for sensing said business record and transmitting sensed information to said array in successive lines along one coordinate direction thereof, means for successively enabling groups of said elements in lines along another coordinate direction thereof, the elements in each said last lines being equal in number to the number of information characters employed whereby selected ones of said elements attain a first stable state, means for successively enabling said elements along the other said coordinate direction causing those elements in said first stable state to revert to a normal state, said means including a chain of cascade connected stages each comprising a magnetic core and thyratron successively operative in accordance with a prescribed rate, each of said cores having a first, second and third winding with the first winding of each of said cores connected to said thyratron, circuit connections between the second windings of said cores and the thyratron associated with a succeeding one of said cores and adapted to activate that thyratron only when the flux direction within the core of said second winding changes from a predetermined direction to the other direction in response to an actuating signal applied to said third windings, activation of said thyratron discharge device causing current flow in said first winding and establishing a predetermined flux direction within the core of said first winding, and a load circuit connected in series with each of said first windings and said discharge devices and including said means for enabling said element along said other coordinate dimension.

10. An information processing system comprising in combination, sensing means adapted to read information from a standard record card in parallel form and including a conductive element positioned at one side of said card, a row of sensing devices positioned at the opposite side of said card whereby circuits are completed with said conductive element through said perforations to develop differentially timed electrical impulses indicative of the value represented by said perforations, a capacitor in each of said sensing circuits, means for charging said capacitors for subsequent discharging through said sensing circuits to produce said timed impulses, a buffer storage device comprising an array of bistable magnetic elements arranged in columns corresponding in number to the columns of said record card and having in each column a core for each one of a plurality of designations employed thereby, means including said sensing circuits for causing said cores in each column to change from a first to a second stable state in response to electrical impulses representative of the numerical value of the character corresponding to that column as a record card is sensed, means for sensing the changed state of said cores in column by column fashion for delivery of the information stored therein in serial form, said means including a ring circuit comprising a plurality of magnetic cores, a first, second and third winding on each of said cores, a discharge device for each of said cores connected to the first winding thereof, circuit connections between the second winding on one of said cores and the discharge device associated with another of said cores and adapted to activate that discharge device only when the flux direction within the core of said second winding changes from a predetermined direction to the other direction in response to an actuating signal applied to said third windings, actuation of said discharge device causing current flow in said first winding and establishing a predetermined flux direction within the core of said first winding, and a load circuit connected in series with each of said first windings and said discharge device.

11. An information processing device comprising an array of coordinately arranged memory elements for registering information from a business record, means for simultaneously transmitting plural information items sensed from said record to said array in lines along one coordinate direction thereof, means for coincidentally and successively enabling groups of said elements in lines along another coordinate direction thereof, the elements in each said last lines being equal in number to the number of information characters employed whereby selected ones of said elements attain a first stable state, and means for thereafter successively enabling said elements along said one coordinate direction thereof and causing those elements in said first stable state to revert to a normal state for delivering the information stored therein, said latter means including a pulse distributor operated in accordance with a prescribed rate.

12. An information processing buffer storage and conversion device comprising an array of bistable magnetic cores arranged in columns corresponding in number to the components of a multi-digit character and having in each column a core for each one of a plurality of code designations, pulse means for causing particular combinations of said cores in each column to change from a first to a second stable state in response to coincident electrical impulses representative of the numerical value of the component of the multi-digit character corresponding to that column, means for sensing the changed state of said cores in column by column fashion for delivering the information stored therein in serial form and including a pulse producing distributor component activated in accordance with a rate of operation desired by a utilization device.

13. An information processing buffer storage device comprising an array of coordinately arranged bistable magnetic memory cores having a number of columns of cores corresponding with a number of items of information and having in each column a number of cores corresponding with the number of variations in said items, pulse means for causing certain of said cores in each column to successively register the information delivered thereto in serial form as coincident electrical impulses representative of the variations in the items, means for interrogating columns of said array in accordance with successive item variations in response to electrical impulses developed at a rate determined by apparatus adapted to employ said stored information whereby said information is delivered in parallel form.

References Cited in the file of this patent

UNITED STATES PATENTS

| | | |
|---|---|---|
| 1,832,237 | Noss | Nov. 17, 1931 |
| 1,982,216 | Lowkrantz | Nov. 27, 1934 |
| 2,006,582 | Callahan et al. | July 2, 1935 |
| 2,045,437 | Daly | June 23, 1936 |
| 2,105,291 | Maul | Jan. 11, 1938 |
| 2,323,824 | Maschmeyer | July 6, 1943 |
| 2,323,833 | Mixer | July 6, 1943 |
| 2,643,290 | Hansen | June 23, 1953 |
| 2,652,501 | Wilson | Sept. 15, 1953 |
| 2,691,154 | Rajchman | Oct. 5, 1954 |
| 2,702,380 | Brustman et al. | Feb. 15, 1955 |
| 2,708,267 | Weidenhammer | May 10, 1955 |
| 2,750,580 | Rabenda et al. | June 12, 1956 |
| 2,757,864 | Pollard et al. | Aug. 7, 1956 |
| 2,771,599 | Nolde et al. | Nov. 20, 1956 |